US 8,132,091 B2
Mar. 6, 2012

(12) United States Patent
Nabutovsky

(10) Patent No.: US 8,132,091 B2
(45) Date of Patent: Mar. 6, 2012

(54) LINK EXCHANGE SYSTEM AND METHOD

(76) Inventor: Serge Nabutovsky, Sunny Isles Beach, FL (US)

(*) Notice: Subject to any disclaimer, the term of this patent is extended or adjusted under 35 U.S.C. 154(b) by 0 days.

(21) Appl. No.: 12/994,750

(22) PCT Filed: Aug. 6, 2009

(86) PCT No.: PCT/US2009/004493
§ 371 (c)(1),
(2), (4) Date: Dec. 6, 2010

(87) PCT Pub. No.: WO2010/016904
PCT Pub. Date: Feb. 11, 2010

(65) Prior Publication Data
US 2011/0078550 A1    Mar. 31, 2011

(51) Int. Cl.
*G06F 17/00* (2006.01)
(52) U.S. Cl. .................................................. 715/206
(58) Field of Classification Search .............. 715/205, 715/206, 208, 209, 234
See application file for complete search history.

(56) References Cited

U.S. PATENT DOCUMENTS

| | | | |
|---|---|---|---|
| 5,995,099 A | 11/1999 | Horstmann | |
| 6,145,000 A * | 11/2000 | Stuckman et al. | 709/219 |
| 6,321,242 B1 * | 11/2001 | Fogg et al. | 715/236 |
| 6,591,261 B1 | 7/2003 | Arthurs | |
| 6,597,377 B1 * | 7/2003 | MacPhail | 715/738 |
| 6,754,873 B1 | 6/2004 | Law et al. | |
| 7,082,470 B1 | 7/2006 | Lesser | |
| 7,231,405 B2 | 6/2007 | Xia | |
| 7,321,889 B2 | 1/2008 | Smadja et al. | |
| 7,546,334 B2 * | 6/2009 | Redlich et al. | 709/201 |
| 7,548,915 B2 * | 6/2009 | Ramer et al. | 705/14.54 |
| 7,610,276 B2 * | 10/2009 | Yomtobian | 1/1 |
| 2001/0044825 A1 * | 11/2001 | Barritz | 709/203 |
| 2002/0004803 A1 * | 1/2002 | Serebrennikov | 707/513 |
| 2003/0088553 A1 | 5/2003 | Monteverde | |
| 2003/0208401 A1 | 11/2003 | Karsten | |
| 2004/0237037 A1 | 11/2004 | Sweet et al. | |
| 2005/0021862 A1 | 1/2005 | Schroeder et al. | |
| 2006/0015366 A1 | 1/2006 | Shuster | |
| 2006/0168006 A1 * | 7/2006 | Shannon et al. | 709/206 |
| 2007/0100653 A1 * | 5/2007 | Ramer et al. | 705/1 |
| 2007/0226206 A1 | 9/2007 | Pavlovski | |
| 2007/0256003 A1 * | 11/2007 | Wagoner et al. | 715/501.1 |
| 2007/0271133 A1 | 11/2007 | McElhinney | |
| 2008/0046316 A1 | 2/2008 | Shah et al. | |
| 2008/0077556 A1 | 3/2008 | Muriente | |
| 2008/0177858 A1 * | 7/2008 | Aarnio et al. | 709/217 |
| 2008/0214148 A1 * | 9/2008 | Ramer et al. | 455/414.1 |
| 2008/0270549 A1 * | 10/2008 | Chellapilla et al. | 709/206 |

OTHER PUBLICATIONS

"Free Automatic Link Exchange", linktradeexchange.com, 2 pages, printed from Internet, May 14, 2008.
"LinksValue", www.linksvalue.com, 2 pages, printed from Internet, May 14, 2008.
"One Way Link Exchange—Free", www.gimmelinks.com, 1 page, printed from the Internet, May 14, 2008.

* cited by examiner

*Primary Examiner* — Laurie Ries
(74) *Attorney, Agent, or Firm* — Richard C. Litman

(57) ABSTRACT

The link exchange system and method 100 automatically creates links between web sites. Specifically, the method of creating links includes providing an account Owner the opportunity to create and manage whitelists 111 and blacklists 116 which are used as filters to automatically accept or decline a proposed link according to criteria set forth in the respective lists. If the link request is accepted, the link is created on the account Owner's link page(s).

17 Claims, 13 Drawing Sheets

SITE LOGO

PROGRAM HIGHLIGHTS

Auto-exchange — 250a
Auto-exchange allows you to exchange links in automatic mode. You only have to choose a category of sites which to exchange links with and their minimum PR.

ABC-linking — 250b
Having ability to use this function, you can essentially increase the efficiency of link exchange. In this mode link from site A pointing to site B and link from site B is pointing to site C.

Advanced catalogue — 250c
The advanced catalogue allows you to simplify the process choosing a site or sites for an exchange.

Messaging function — 250d
Wish to discuss details of an exchange with the owner of a site personally? No problems. Write him a letter. It will be completely anonymous and will get delivered to the destination.

Tech Support — 250e
Technical support center will answer any and all of your question and will help to solve any of your problem related to Trafficfeed.

Mass addition — 250f
Mass addition tool will allow you to include all of the links at once. Instead of long and tiresome form filling, you can use Mass Addition tool to enter all of them at once or import from a text file.

Submit links by form — 250g
Thanks to the external form exchange system that we provide you with and which you place on your site, even those who do not have an account with Trafficfeed system can exchange links with you.

---

30 april 2008
April 30, 2008 UPDATE: Second statge of Beta testing has beganSystem has entered the second stage of the Beta testing. Most ofthe major bugs were worked out. And we are on the way to completing the final touches, before adding more functionality to the system.

07 december 2007
System Update
Now you can see if exchange between sites possible or no directly from catalogue.

0 november 2007
Beta
Our system's beta-testing has begun. Feel free to register. We'll begrateful for any of your comments and proposals.

Last added sites — 236

2008-05-01 15:46:25 — 242
http://www.-.com | account user name
http://www.-.com/
title: Miami FL Real Estate
keywords: Miami FL Real Estate, Sunny Isles Beach Listings, ocala real estate, listing, Sunny Isle, Sunny Isle Beach, Condominium, Condominimum, Condominimum Sunny Isles, Condominium Sunny Isles, condo, house, appartment, conoreal estate property, real estate featured property, properties, real estate, florida, sunny isles real estate
description: Miami FL Real Estate - Sunny Isles Real Estate Properties 2008-04-24 15:16:38
Hello2 | tester
http://- -.com
title: no results

---

Login form
Sign Up  232
Login:
Password:
[Submit]
Forgot Password

Donation form
Name:  234
Payment amount*:
Payment method*:
[PayPal GBP]
[Donate]

Link Exchange Categories:
All categories
Adult
Art
Bussines and Finance
Computers
Countries and regions
Education
Games
Health
Home and family
Info
Internet
Leisure
News and media
Science
Shopping
Society
Sport

*Fig. 2*

LINK EXCHANGE SYSTEM AND METHOD

TECHNICAL FIELD

The present invention relates to website management. More specifically, this invention relates to a link exchange system and method for the automated creation, maintenance, and management of links on subscriber websites utilizing a service website, upon which the system resides.

BACKGROUND ART

The Internet is a collection of computers linked together throughout the world. Some of these computers act as clients for their users. Other computers act as servers, or hosts, for one or more websites. Each website Internet Protocol (IP) address may be shared by multiple sites or may be unique to one particular website, and these addresses are related to website names conventionally known as Universal Resource Locators (URLs). The URLs on a website's page(s) "point" to another site and are referred to as "links".

The Owners or managers of websites (Webmasters) all share a common interest: increased user traffic to their websites. A common way this is promoted among Webmasters is their mutual agreement to include links to each other's websites. Users will often utilize these links to navigate to other sites of interest, thus increasing traffic. Navigation is accomplished by the user operating a link by clicking his/her mouse on the link's web-page representation (i.e., the URL or some symbol, banner or icon representing the URL of the website). This process eliminates the need for the user to enter the URL by typing it into the web browser being used. By simplifying the navigation process, it's been discovered that users are more likely to visit more websites.

When two Webmasters agree to mutual links, these are often referred to as reciprocal links, because of their reciprocal agreement. Should one Webmaster remove a link to the other's website, the "offended" Webmaster needs to know the mutual agreement has been broken so that appropriate action can be taken. Checking for this situation manually is very time-consuming. Accordingly, it is common for link exchange websites to initiate an automated, computer-implemented spidering process through the reciprocally linked Webmasters' sites beginning at their respective link addresses to verify that the reciprocal link information is present at the Webmasters' sites.

In the typical linking process, the Webmaster or Owner of Website B becomes interested in a reciprocal link with Website A. Subsequently, Website B's Owner or Webmaster sends an e-mail message to Website A's Webmaster (typically Webmaster@websiteA.com) identifying themselves (typically websiteB.com) and proposing a reciprocal link. Next, Website A's Owner or Webmaster visits Website B and determines his/her interest. Then the Owners reach agreement and turn the technical task of implementing the links over to their respective Webmasters. Typically, the Website A Webmaster fulfills his/her end of the agreement first by editing Website A's web page using an appropriate HTML editor and inserting Website B's URL (converting the address text into a hyperlink) into the appropriate web page on Website A. This may be augmented by some symbol, banner, or icon (either physically-furnished or access-furnished by Website B's Webmaster). If multiple links exist on a single page, it may be necessary to set the font of the link to correspond with other links on the page.

Other parameters concerning the link may also need to be adjusted at this time by the Website A Webmaster, possibly including positional placement on the web page or other attributes. Moreover, Website A Webmaster notifies the Website B Webmaster (typically by e-mail) saying "we've posted our link to you; you post ours". Of course, a variety of message types and/or wording could be utilized to convey the information in the message. Website B Webmaster edits Website B's web page following essentially the same procedure as outlined above.

The practice of automatically linking the web page of the first Webmaster to the web page of the second Webmaster, without any intervention from the first Webmaster, is not believed to always be in the best interest of the first Webmaster. For example, suppose the first site is owned by a politician of a large political party and maintains a website supporting his/her beliefs and political party. A second Owner has a website for another large political party, and perhaps, is a political opponent of the first Webmaster. Under existing systems, the second Owner (or his Webmaster) could establish a link from the first Owner's website. As another example, perhaps the first Owner is a pro-life activist that maintains a website and the second Owner advocates pro-choice through a website. Obviously, the first Owner may not likely desire the second Owner (or his Webmaster) to establish a link from the first Owner's site to the second Owner's site.

Accordingly, a need exists for a method of automatically establishing links according to criteria predefined by the website owner(s), and even bi-directional (or reciprocal) links between two websites. Specifically, a need exists for creating web site links, which greatly simplifies the traditional method of creating web sites, but still provides for approval according to criteria set by the first site's Webmaster to allow the second site's Webmaster to establish a link to the first web site.

Thus, a link exchange system and method solving the aforementioned problems is desired.

DISCLOSURE OF INVENTION

The link exchange system and method automatically creates and hosts links between web sites. The links can be hosted on the account owner's server/web site. Specifically, the method of creating links includes providing an account Owner the opportunity to create and manage whitelists and blacklists through the settings in multiple criteria sections, which are used as filters to automatically accept or decline a proposed link according to the criteria set. If the link request is accepted, the link is created on the account Owner's link page(s). Links can be categorized on the link page(s).

Moreover, links can be rotated on the link page(s) (any page on the site can be a link page) to provide the opportunity for more visibility of at least some links on a particular web page. Additionally, rotation of the links may improve search engine optimization.

These and other features of the present invention will become readily apparent upon further review of the following specification and drawings.

BRIEF DESCRIPTION OF THE DRAWINGS

FIG. 2 is a screen shot of an exemplary login web page of the link exchange system according to the present invention.

Similar reference characters denote corresponding features consistently throughout the attached drawings.

BEST MODES FOR CARRYING OUT THE INVENTION

Figure 1:
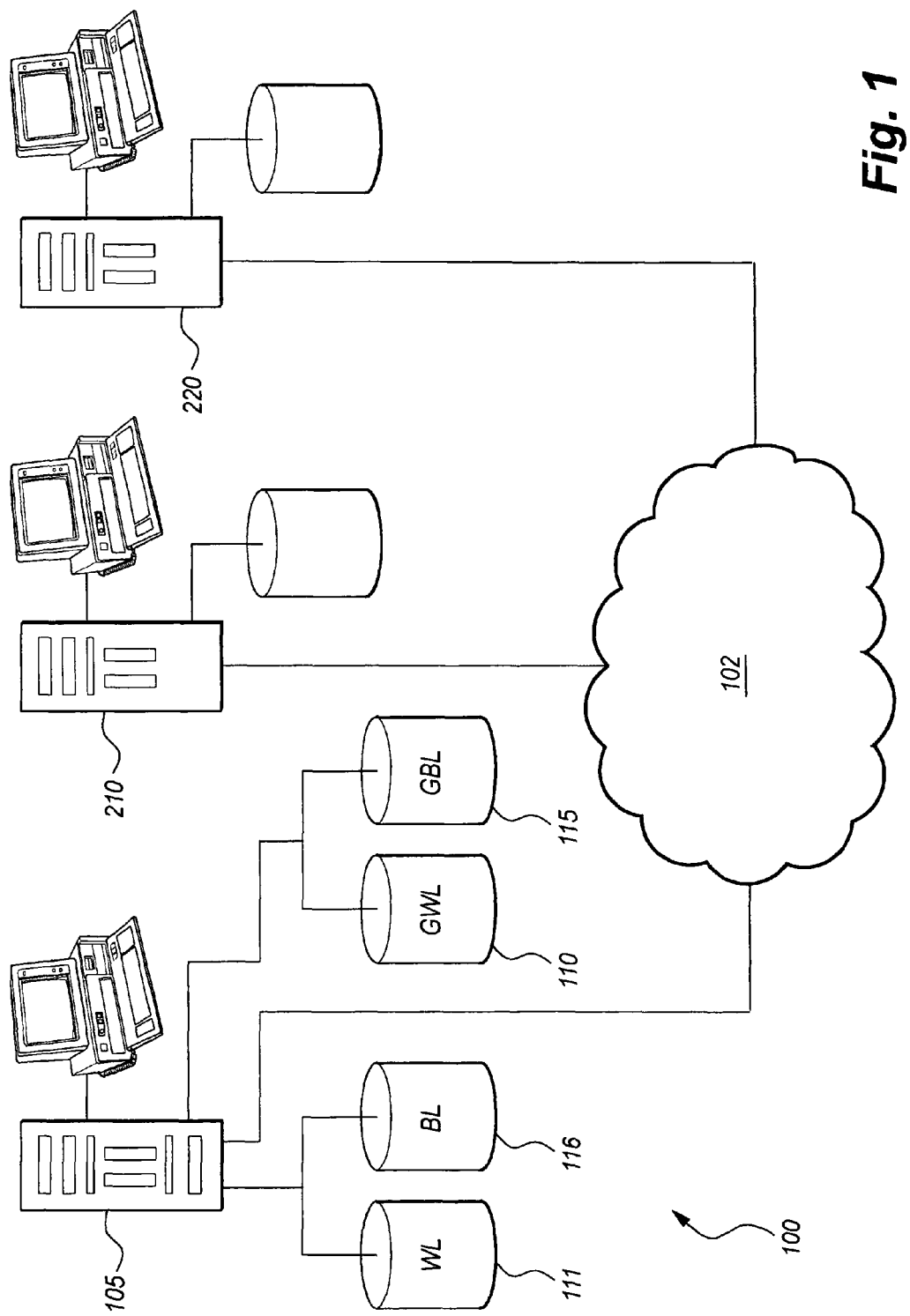
FIG. 1 is a block diagram of possible hardware configuration of a link exchange system according to the present invention.
Figure 6A:
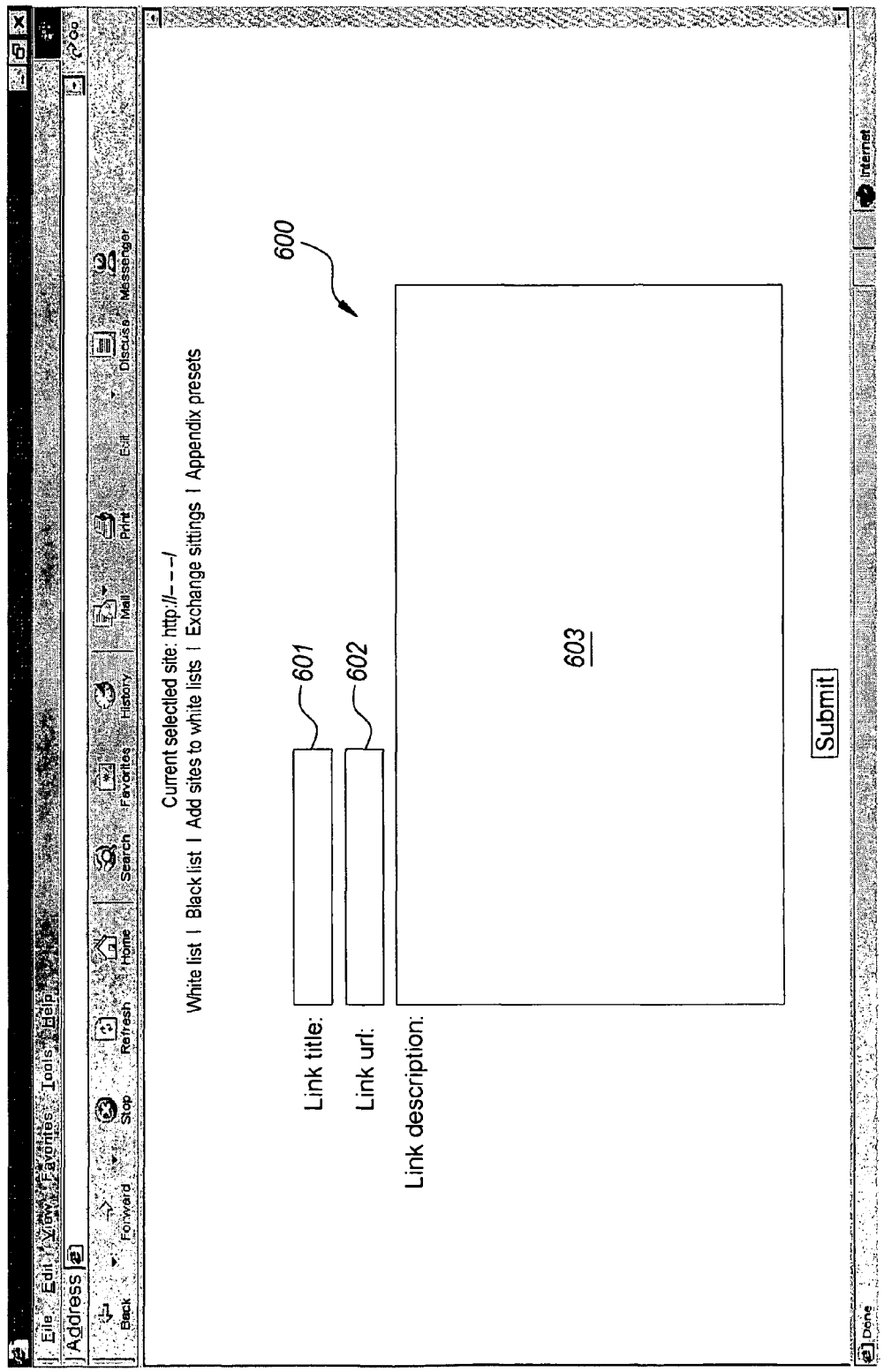
FIG. 6A is a screenshot showing an exemplary web page for adding link information to a whitelist in a link exchange system according to the present invention.
Figure 6B:
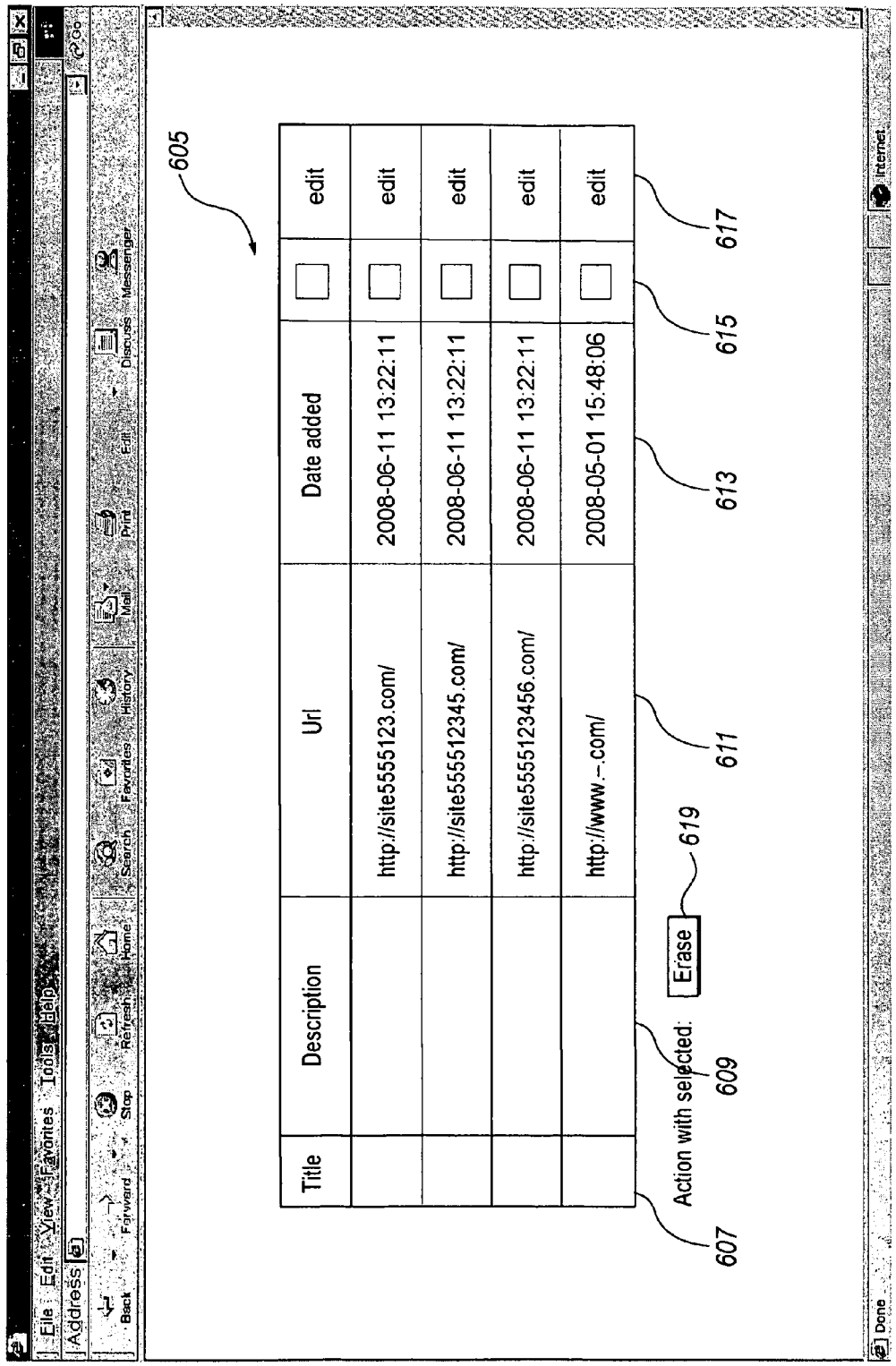
FIG. 6B is a screenshot showing an exemplary whitelist in a link exchange system according to the present invention.
Figure 7A:
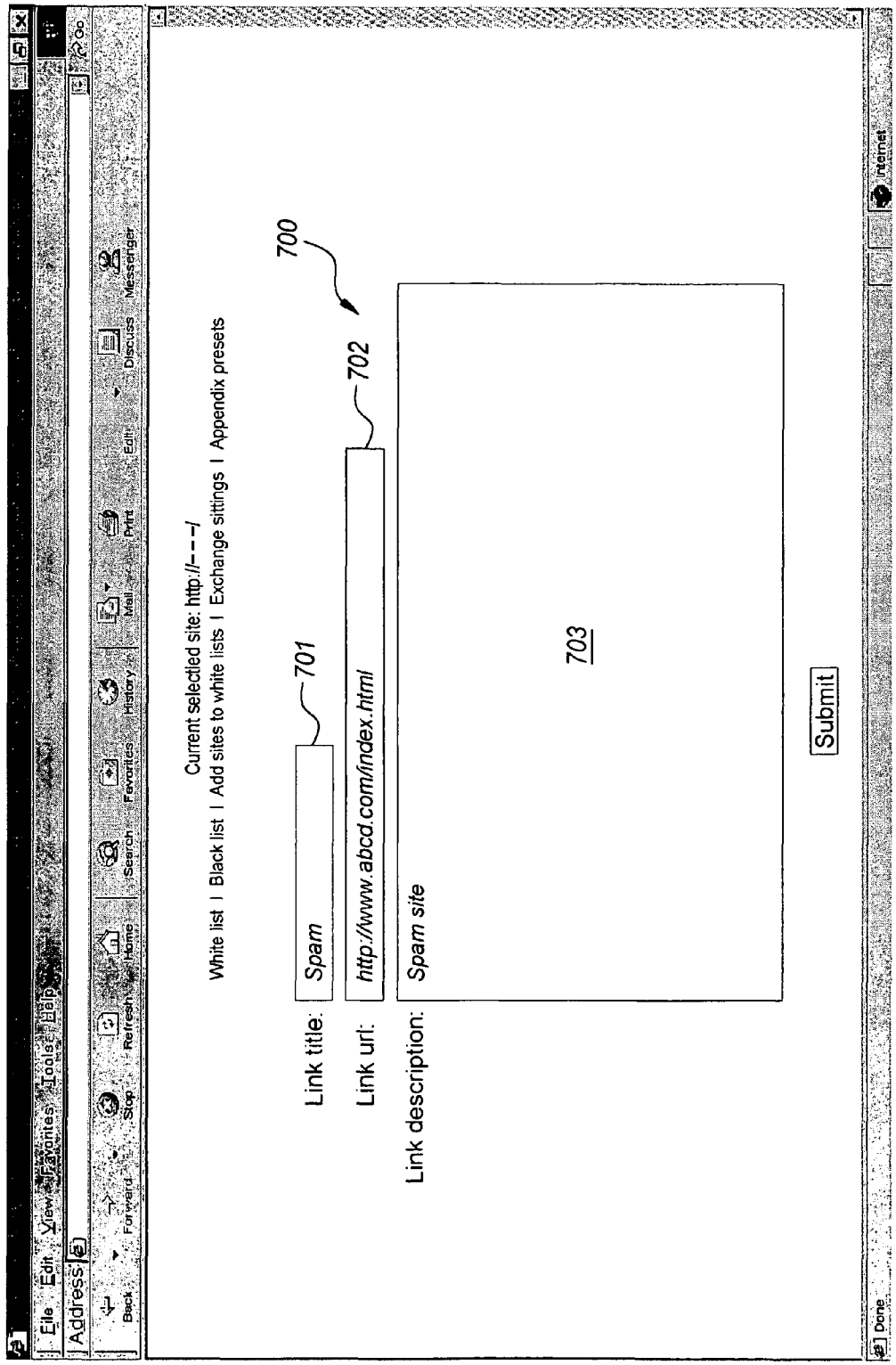
FIG. 7A is a screenshot showing an exemplary web page for adding information to a blacklist in a link exchange system according to the present invention.
Figure 7B:
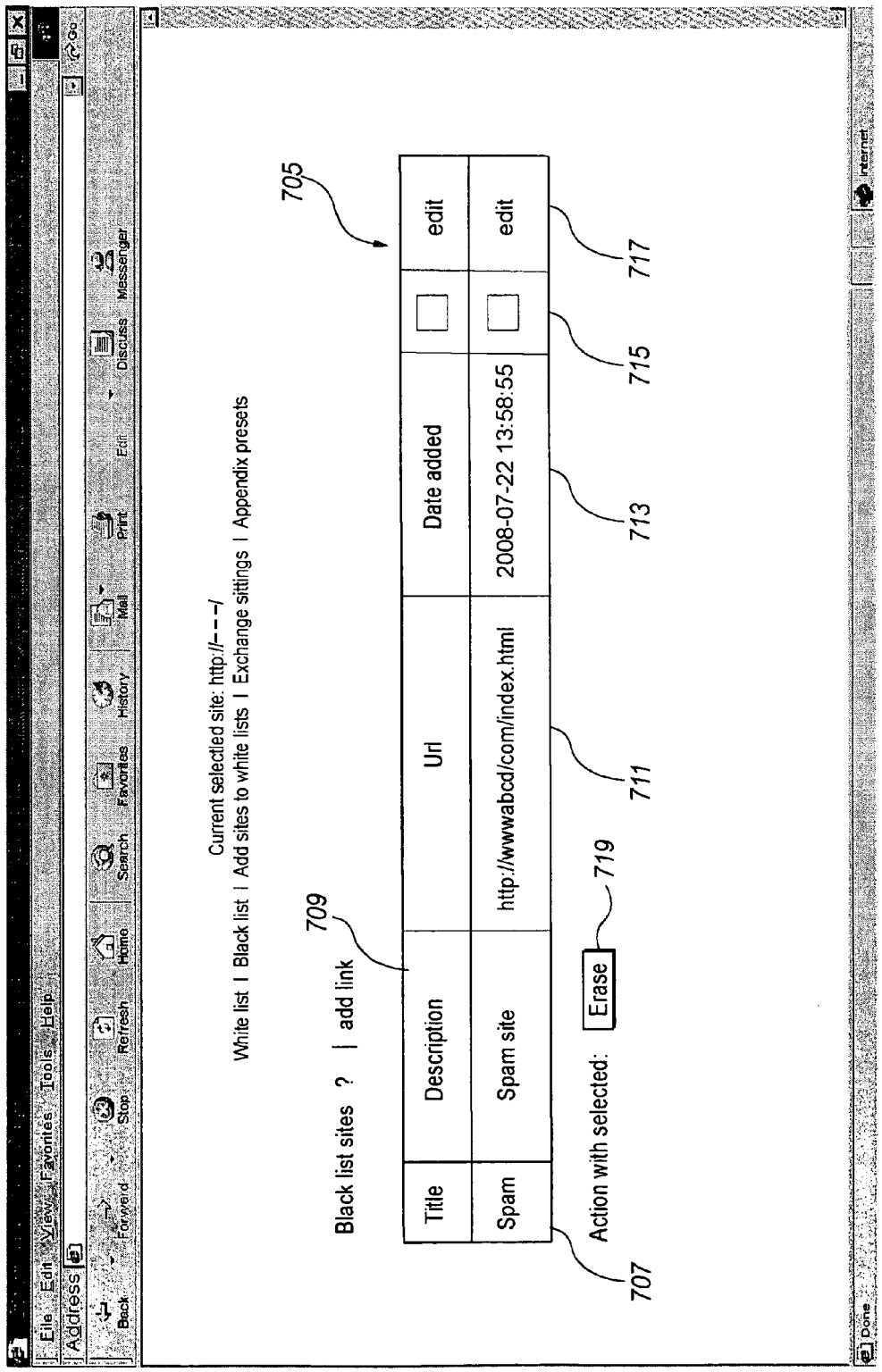
FIG. 7B is a screenshot showing an exemplary blacklist in a link exchange system according to the present invention.

The present invention relates to a link exchange system 100 and method that automatically creates and hosts links between web sites published by web servers 210 and 220 (shown in FIG. 1). Specifically, the method of creating links includes providing an account Owner the opportunity to create, manage and use whitelists 605 (shown in FIG. 6B) and blacklists 705 (shown in FIG. 7B) through the settings in multiple criteria sections, which are used as filters to automatically accept or decline a proposed link according to the criteria set. As shown in FIG. 6A, data and/or website whitelist entries are made on the whitelist entry page 600, and include a link title field 601, a link URL field 602, and a link description field 603. Whitelist page 605 includes a title column 607, a description column 609, a URL column 611, a date added column 613, a checkbox column 615, and an edit column 617. If the link request is accepted, the link is created on the account Owner's link page(s). As shown in FIG. 7A, an exemplary Blacklist entry page 700 may provide a link title 701, a link URL field 702, and a link description field 703. As shown in FIG. 7B, the blacklist page 705 may include a title column 707, a description column 709, a URL column 711, a date added column 713, a checkbox column 715, and an edit column 717. An erase action button 719 is also provided.

As shown in FIGS. 1-8C, the system 100 may comprise at least one web server 105 with connectivity to a plurality of data storage units 111, 116, 110 and 115 for storage and retrieval of application data, website data, a first plurality WL (shown stored in data storage unit 111 in FIG. 1) of whitelists 605 (shown in FIG. 6B) that are applicable to webmasters, a second plurality BL (shown stored in data storage unit 116 in FIG. 1) of blacklists 705 (shown in FIG. 7B) that are applicable to webmasters, a third plurality GWL (shown stored in data storage unit 110 in FIG. 1) of whitelists 605 that are applicable to the system globally, and a fourth plurality GBL (shown stored in data storage unit 115 in FIG. 1) of blacklists 705 that are applicable to the system globally.

The web server 105 is accessible to users via a network 102. Preferably, the network 102 is the Internet, which would provide for the largest number of users over the widest area of coverage. Users are generally webmasters of other websites. A first webmaster may control a website published by web server 210. A second webmaster may control a website served by web server 220. The users (account owners of web servers 210 and 220) provide their respective link information to the system's web server 105. As used herein, the term "link information" includes any necessary information that enables the system's web server 105 to establish a link to their web site, or from their web site to another web site. Link information includes at least the URL of the web site, and may also include the category of the web site, tags, image URLs, banner URLs, directory and file name information for the site's link page, permissions required for accessing and modifying the site's link page, etc. After providing link information, the users may then specify filter criteria for sites that they are willing to establish links (either reciprocal or unilateral) to (the whitelist 605) and/or filter criteria for sites that they are not willing to establish links to (the blacklist). With appropriate logins and passwords the first webmaster and the second webmaster can also have user access (via Internet 102) to applications in the link exchange system 100 residing in link exchange server 105. The system's web server 105 will compare each web server's link information to the filter criteria on the whitelists and blacklists. If even one item of link information is on a blacklist, then a link exchange will not be established between the two web servers 210 and 220. If no link information appears on a blacklist and at least one item of link information appears on a whitelist, then the system's web server 105 will automatically establish reciprocal hyperlinks on the websites of both web servers 210 and 220.

Exemplary applications include search engine optimization, web services, and account management for registered users of the system 100. Exemplary applications may run on a single computer, or in a distributed processing environment, or the like.

Exemplary data storage units 111, 116, 110 and 115 may communicate with the server 105 and store web pages, blacklists 705 and whitelists 605, active website links and the like. The system 100 utilizes application programming interfaces (API's) and/or user interfaces (UI's) to accept requests from website owners/account holders and process the whitelists 605, blacklists 705, or other data requiring updates and maintenance by the system 100.

Whitelists 605 include identifiers or filter criteria for permissible links and blacklists include identifiers or filter criteria for impermissible links. Examples of identifiers include, but are not limited to, a website name, domain name, IP address, keywords associated with the website, or the like.

The whitelists 605 and blacklists 705 each have a static portion and a dynamic portion. The static portion is maintained and controlled by the webmasters. The dynamic portion is maintained and controlled by the system 100. The whitelists 605 and blacklists 705 can be dynamically maintained based on manual updates, automatic updates, or both of the aforementioned multiple criteria, the static updating being initiated by webmasters associated with the websites, or in the automatic case, the updating is initiated by the system 100. Automatically adding bad websites, i.e., known spammers, or the like, to a global blacklist is also contemplated. A webmaster has an ability to add more than one website to his account. Each website can have different subject matter. For that reason each website can have its own set of blacklists 705 and whitelists 605. Static portions of blacklists 705 and whitelists 605 can be interlinked between websites having a common owner. Global whitelists are also contemplated. As used herein, the terms "global whitelist" and "global blacklist" refer to a whitelist or a blacklist, respectively, that is created by the administrator of the web server 105 and that contains filter criteria applicable to all users of the system as to web sites that are acceptable to link to (the whitelist) or that are not acceptable to link to (the blacklist), respectively.

Preferably, using the appropriate API's and UI's, for access to webmasters' websites, blacklists 705 and whitelists 605, and the like, the system 100 can accept and maintain a plurality of websites and their descriptions in a system database. The system 100 provides an intermediary website for the webmasters to manage their websites and links to other websites. Preferably the link exchange system 100 may be utilized on the Internet, the World Wide Web, Intranets, or any other grouping of networked computers.

The system 100 allows you to carry out an automatic, manual link exchange and ABC-linking. The main advantage of the system 100 is automatic check of back-link, conformity of the back-link, as well as conformity of the website to preset conditions of an exchange. If there is no reciprocal link, or the site is not conforming to the conditions, the exchange will be broken off by the system 100.

Figure 8A:
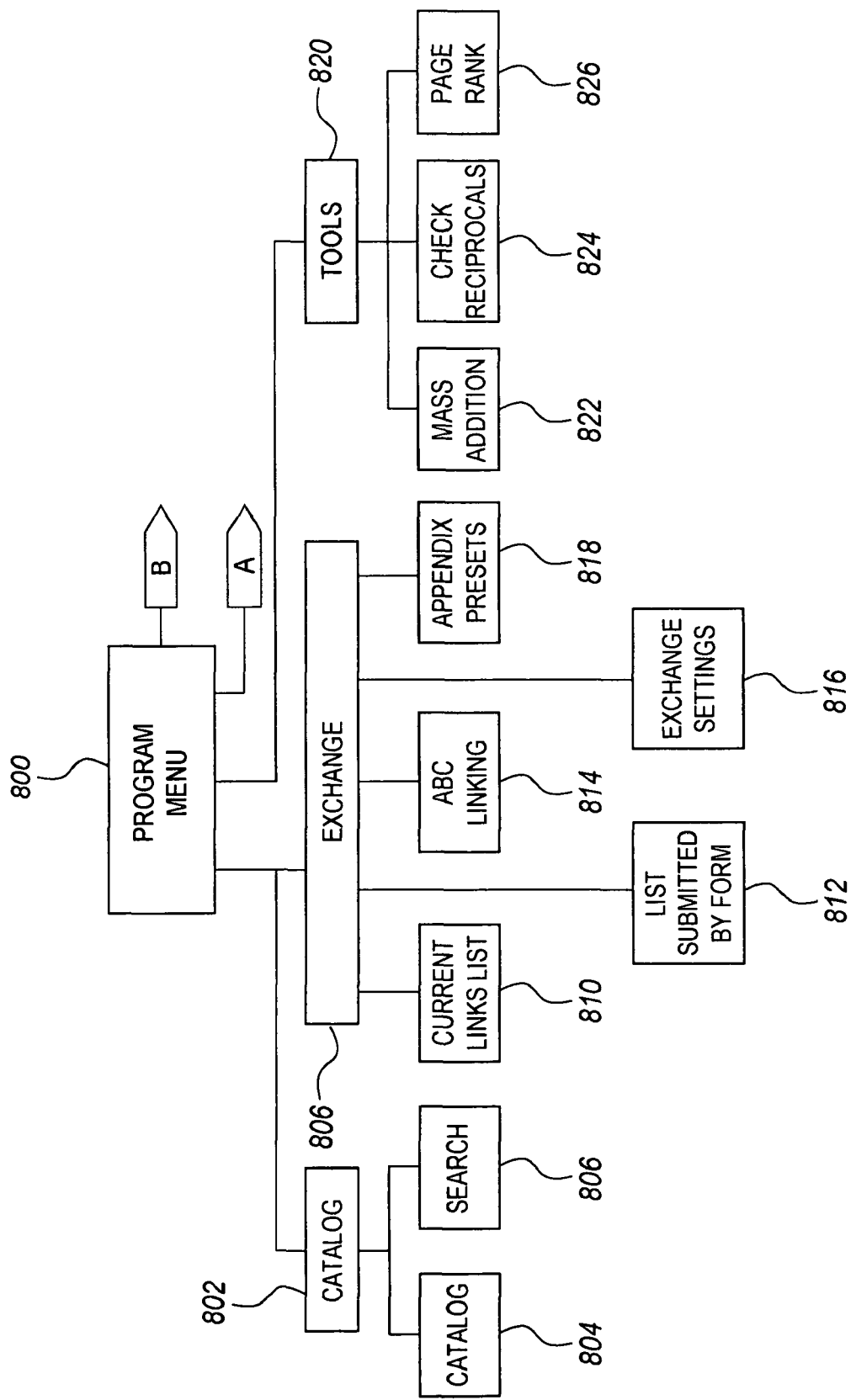
FIGS. 8A, 8B and 8C illustrate a block diagram representing a site map of a server in the link exchange system and method according to the present invention.
Figure 8B:
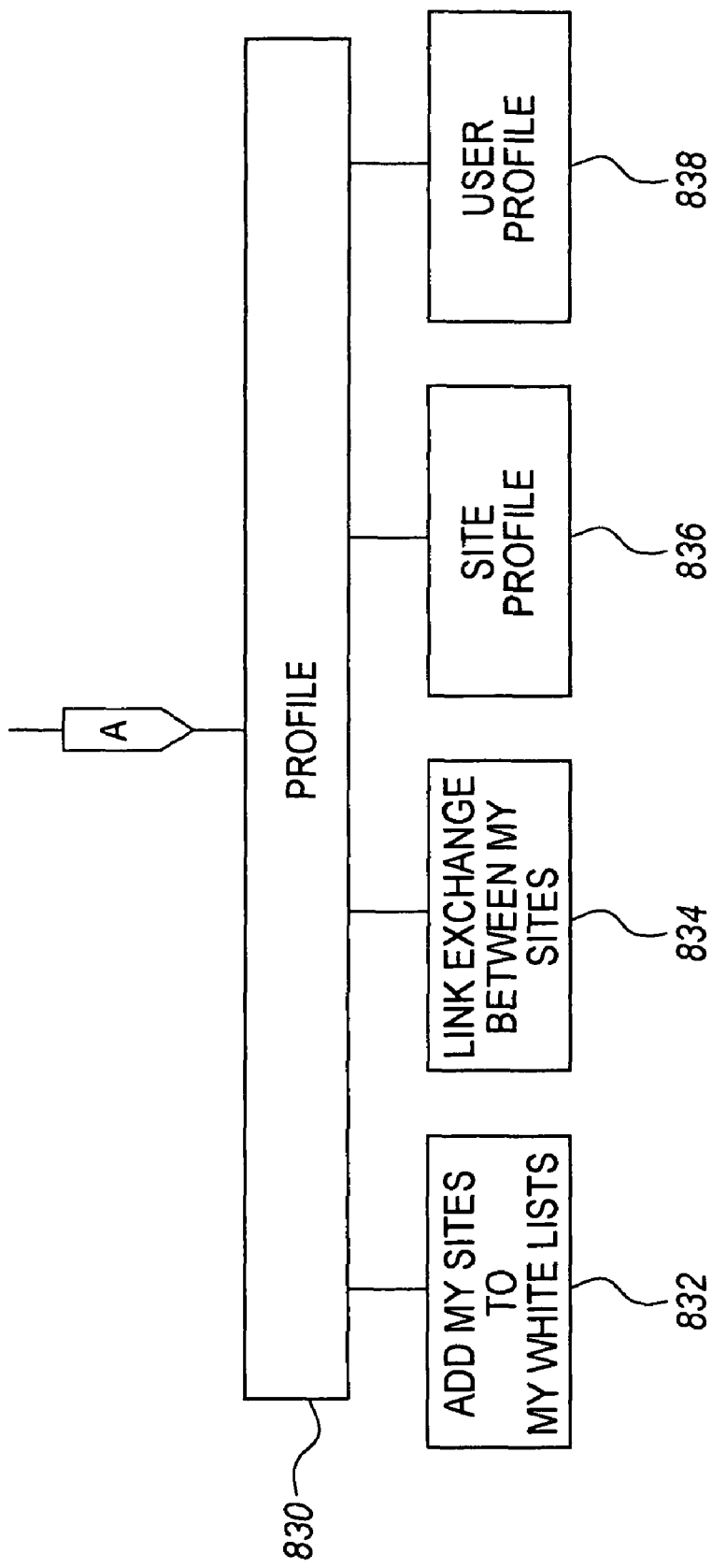
Figure 8C:
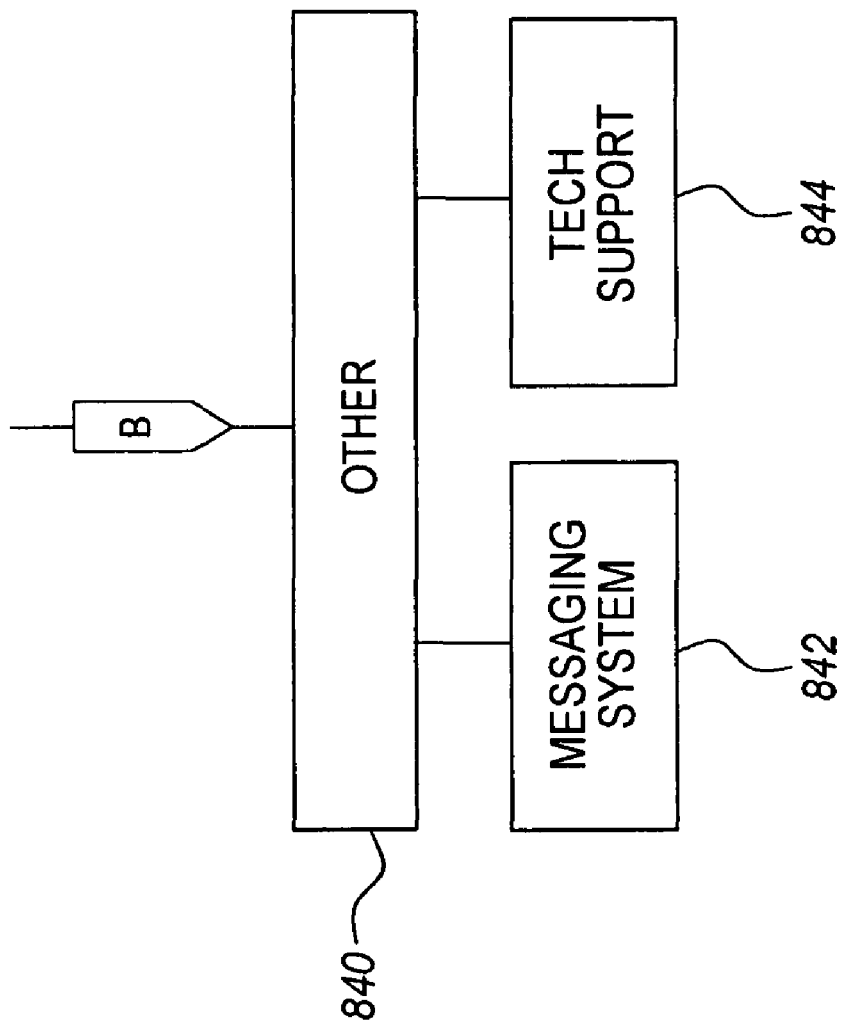

As shown in FIG. 2, a login web page 230 is provided. A login form 236 is provided to allow username and password to be entered and submitted. Depending on the business model utilized by operators of link exchange system 100, a donation form 234 may be provided. The donation form 234 allows a user to make a monetary donation associated with the service provided, by the system 100. Several modes of operations are described under Program Highlights 246. As shown in FIGS. 8A through 8C, functions of the link exchange system 100 may be navigated via the program menu 800. The program menu 800 has branches to the catalog menu 802 (which branches to the catalog 804 and the catalog search 806), the exchange menu 806 (which branches to a current links list 810, a list submitted by form 812, exchange settings 816, ABC linking 814, and Appendix presets 818), the tools menu 820 (which branches to mass addition 822, reciprocal checking 824, and page ranking 826), the profile menu 830 (which branches to Add My Sites to Whitelists 832, Link Exchange Between My Sites 834, Site Profile 836, and user profile 838), and the "other" menu 840, the "other menu" supporting branches to the messaging system 842 and the tech support function 844. The easiest to use operational mode is an Auto-exchange 250a. It is accessible from the exchange menu 806, and it is enough to turn on this function and to enter conditions of an exchange: categories and minimal page rank (PR) of sites with which your site will exchange. Additional exchange parameters 400 (shown in FIG. 4) are available from the exchange settings program selection 816. The system 100 will automatically pick up partners and will carry out an exchange with them on its own. Moreover, the system will independently watch the presence of reciprocal links and their conformity to conditions of an exchange.

To answer to the most demanding inquiries of the webmasters, such functions as ABC-linking 250b (accessible from the ABC linking page 814) are also implemented within system 100. ABC linking makes it possible to create <<non-reciprocal>> link exchanges, in which case site A would link to site B, and site B would link to site C, thus essentially raising the "weight", i.e., the page ranking, of the links in the "eyes" of search engines.

In addition to the aforementioned features, link exchange can be carried out in a manual mode with the assistance of an advanced cataloging and site registering capability in system 100. The system 100 sorts sites by categories, by Google® page rank (PR), and by keywords, and other search engine optimization (SEO) related technical information may also be used by the system 100 to sort sites.

Additional features of the system 100 include an advanced catalogue 250c that allows you to simplify the process of choosing a site or sites for an exchange, and a messaging function 250d that allows for communication among website owners, the messages being delivered to the appropriate destinations. Moreover, a technical support center 250e can answer any and all of consumer questions and help to solve any of problem related to use of the website.

Furthermore, the system 100 provides a mass addition tool 250f that allows a user to include all of the links at once. Instead of long and tiresome form filling, a webmaster can use the mass addition tool 250f to enter all of the links at once or import the links from a text file.

Due to the external form exchange system 250g that is provided by the system 100, and which can be placed on a webmaster's site, links may be added by form by even those who do not have an account with the system 100. A last added site display 236 (last added to the system 100) is also presented on login page 230. The time added 238 is displayed as well as the added website URL 242. Title and keywords 244 are also displayed. A page rank progress bar 240 is displayed next to the URL and account user name display 242. The page rank progress bar 240 graphically and numerically illustrates the page rank (PR) level of the associated website 242. The name of the account user of system 100 is also present there.

The link exchange system 100 may be programmed using any of a plurality of web programming languages, including but not limited to JavaScript®. Dynamic web pages within the inventive website may be programmed using PHP or other suitable server-side compatible, dynamic page scripting language. Preferably the website document type definition (DTD) is defined to be compatible with the World Wide Web Consortium's (W3C's) International Standards Organization (ISO) HTML 4.0 standard or greater.

The link exchange system 100 can accept user specification of where each link for each link partner will appear on the user's site, which means that Webmaster 1, who is exchanging links with Webmaster2 (who has, for example, 3 sites), can, if he so chooses, specify where each link will appear on his site(s).

Figure 3A:
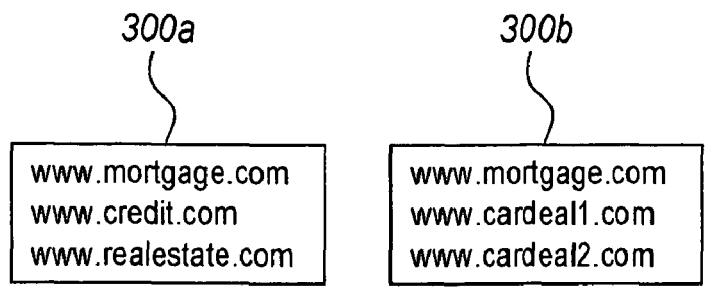
FIG. 3A is a block diagram showing two exemplary site pools in a link exchange system according to the present invention.
Figure 3B:
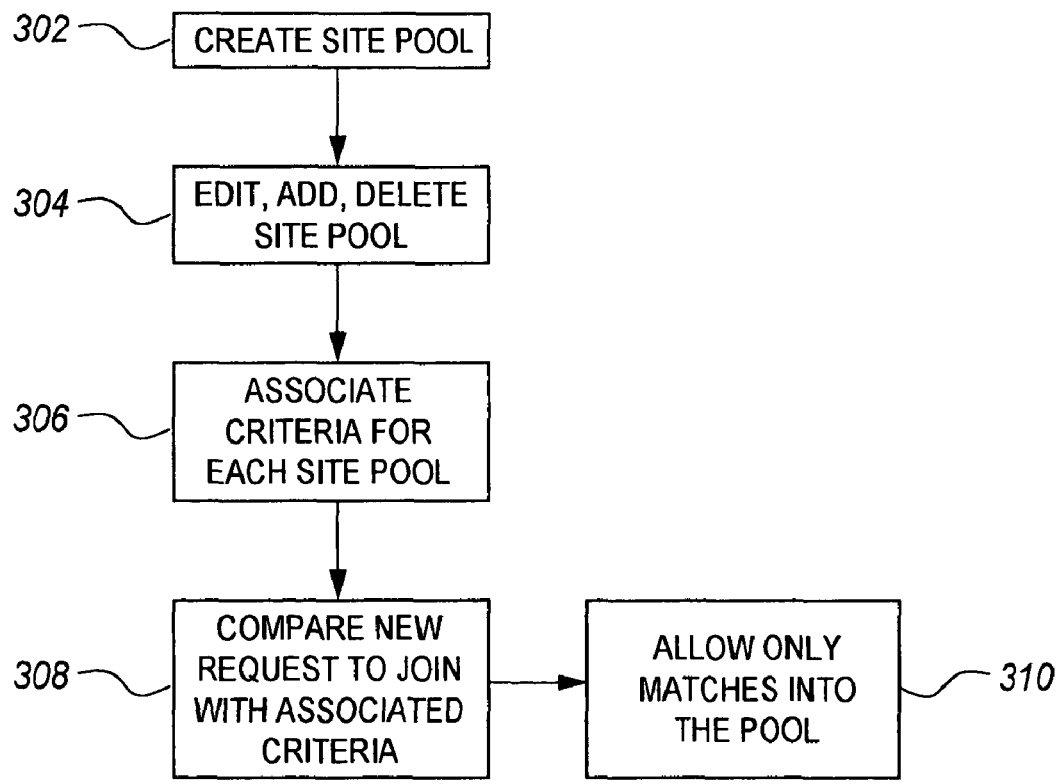
FIG. 3B shows a flowchart for the creation and management of the site pools in a link exchange system and method according to the present invention.

The link exchange system 100 also includes multiple site pools, e.g., pools 300a, 300b (shown in FIG. 3A), including the tools required by an administrator to create and maintain the site pools. As shown in FIG. 3B, utilizing tools of system 100, step 302 permits creation of a site pool. Step 304 permits editing, addition, and deletion of a site pool. Step 306 allows association of criteria for each site pool. At step 308, a comparison of a new request to join a pool is done against the associated criteria for that pool. At step 310, only matches are allowed into the specified pool. The link exchange system 100 provides an option to opt into the pool exchange as publishers, as advertisers or both. The link exchange system 100 accepts administrator specification of multiple criteria associated with each pool. The link exchange system 100 accepts responses from the site publishers, compares those responses and conformity of the publisher's site to the administrator-specified multiple criteria (a similar task is performed by system 100 with advertisers' sites), and then allows into the pool only those site publishers' sites who have matched the criteria set forth by the administrator. Within system 100, site owners are given an ability to choose whether to be included in only one pool or in all pools, since pools will be constructed in hierarchical model from lower to higher, based on multiple criteria.

Sites that choose to participate in the pool exchange program are added or removed from pools based on multiple criteria, e.g., via whitelists 605 and blacklists 705. The system 100 performs criteria checking to add or drop sites from the pools on a periodic basis, e.g., daily or the like. Sites can be demoted, promoted, or moved from one pool to another. The system 100 accepts multiple criteria specified by publishers, the publisher-specified criteria being used to specify which types of sites the publishers want to link to (preferably for a predetermined fee set by the system 100 owner/administrator of the link exchange system 100 or by each webmaster on a case-by-case basis). The link exchange system 100 allows site publishers to place advertisers' links in a specified location, e.g., the front page, a footer, a header, two levels deep, three levels deep, or the like, or on a specific page, or the like. Just as publishers can be moved from pool to pool, the link exchange system 100 may move advertisers from the site of one publisher to the site of another in a dynamic manner, depending on a comparison of multiple criteria set by the advertiser(s) with multiple criteria set by the publisher(s). For example, if an advertiser's site went from page rank PR4 to page rank PR2 and a publisher requires a minimum PR of three for sites he advertises, the comparison performed by the system 100 will fail and the system 100 will then break off the exchange.

Moreover, under auto exchange settings 400, the link exchange system 100 allows each publisher to specify a maximum number of links to publish 405 on their respective sites, and in the example described above, the system 100 automatically substitutes the link removed for another one if such is available. Max links per day 407 and required minimum page rank 409 are also provided for entry by the webmaster. Action buttons provided can save 412a, clear per day 412b, or clear the total 412c. The link exchange system 100 will act similarly with links of the advertisers; if the publisher's site went from PR4 to PR2 and the advertiser requires a minimum page rank of PR3, the system 100 automatically removes the link and places it on the publisher's site who's PR is matching the min PR that was specified by the advertiser in the multiple criteria section, if such site is available. In a case where there are no more sites to publish a particular link to, the system 100 will preferably prorate the fee and credit the advertiser's account. All pro-ratings and movement of advertisers' sites from publisher to publisher, and of publishers' sites from pool to pool, or the like, will be done automatically by the link exchange system 100. (Multiple criteria will be constantly modified, perfected, added, and removed throughout the whole site).

Figure 4:
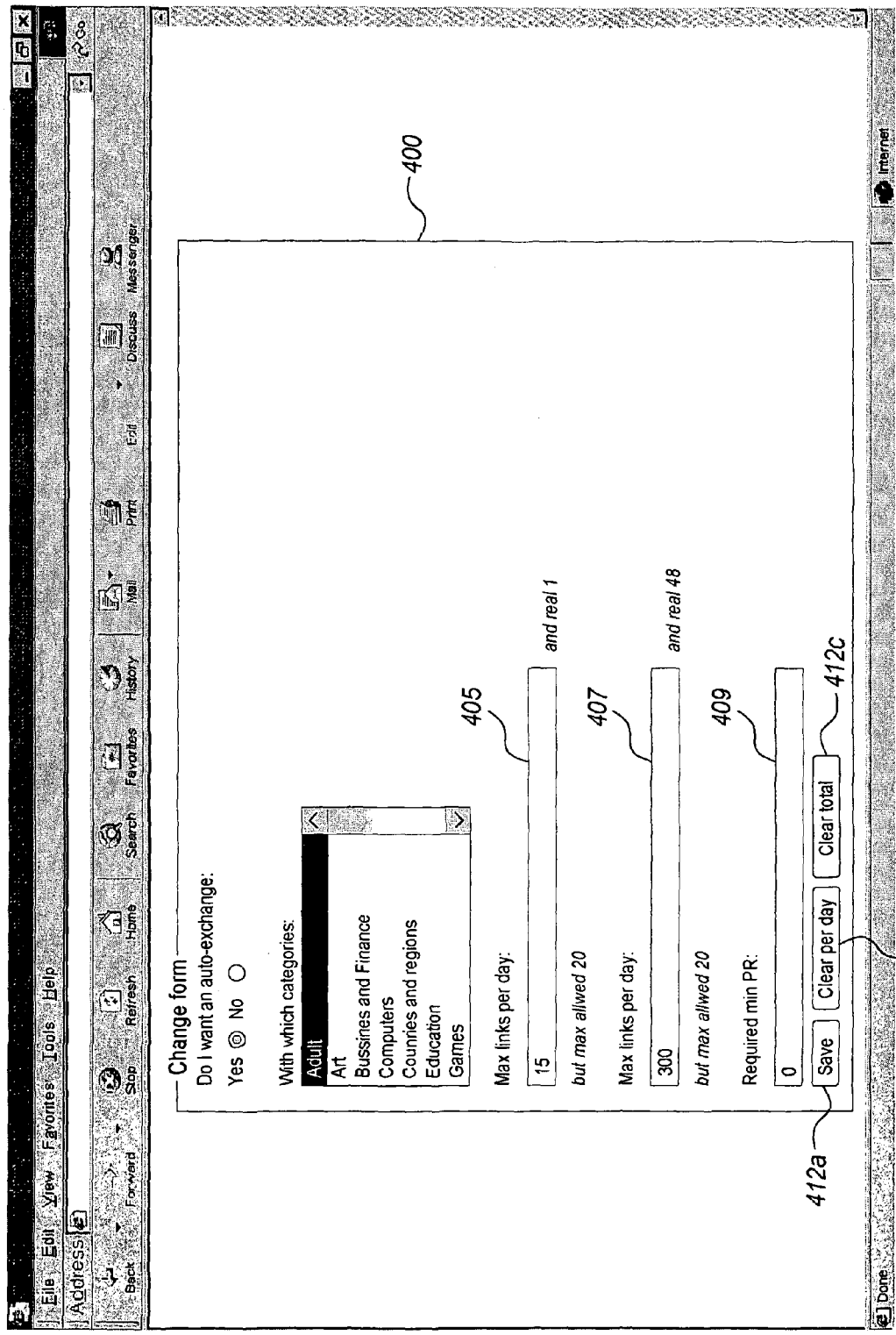
FIG. 4 is a screenshot of an exemplary auto exchange settings page in a link exchange system according to the present invention.

Pools, such as exemplary pools 300a and 300b, can be created by the administrator, who, via a messaging system within the link exchange system 100, can receive user requests for new pools, industry specific pools, country/region specific pools, keyword specific pools, or the like. FIG. 4 shows an exemplary criteria selection page 400. The system 100 contemplates a similarly constructed page to be used for selecting multiple criteria settings for pool exchange and other system functions requiring selection of multiple criteria.

Figure 5A:
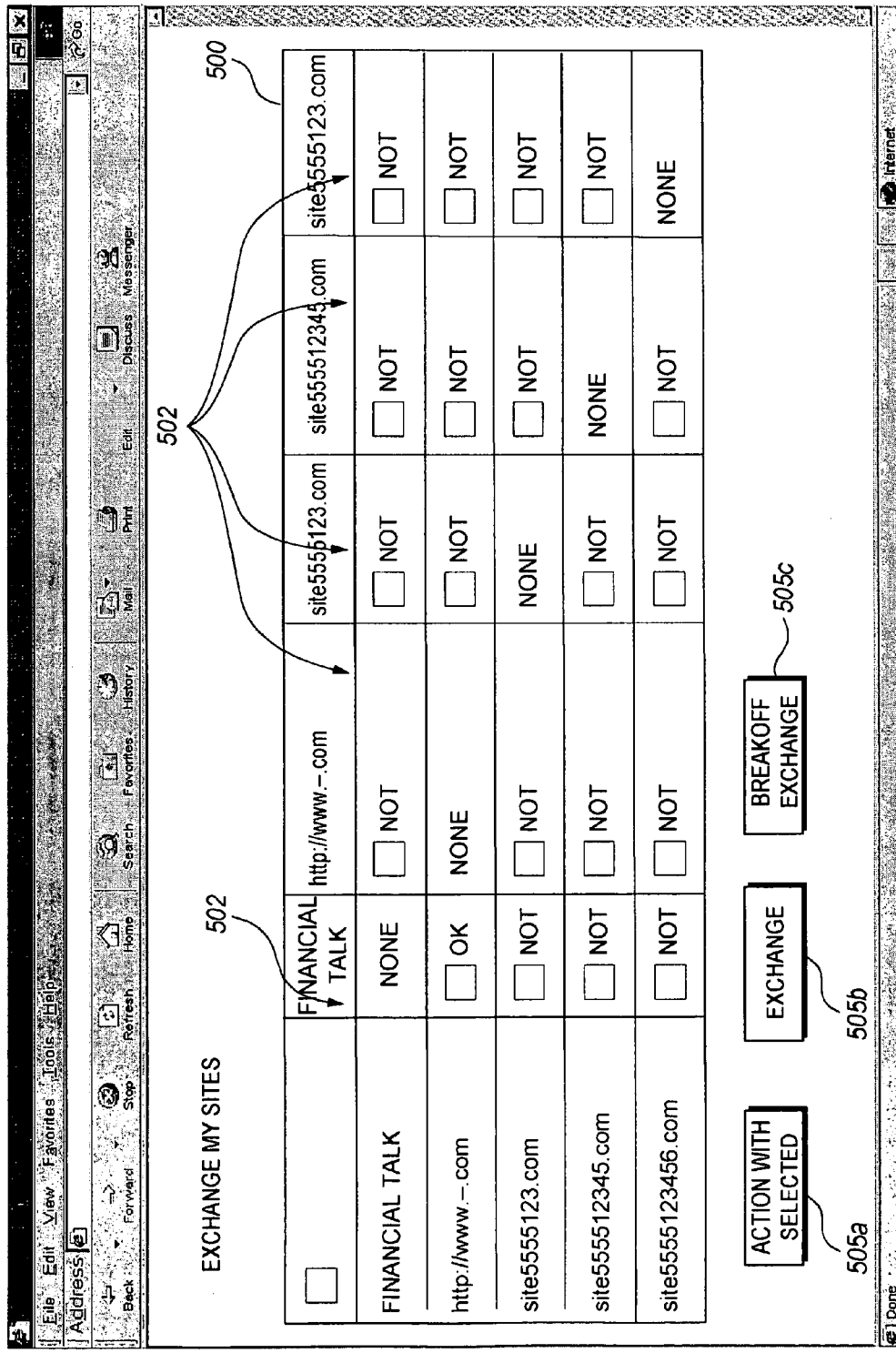
FIG. 5A is a screen shot of an exemplary exchange my sites table in a link exchange system according to the present invention.

As shown in FIG. 5A, the link exchange system 100 provides an exemplary manual exchange of sites having a common owner or within the same account. Checkboxes 502 allow a user to make a link exchange between the sites listed in the rows and the columns, the exchange matrix 500 being accessible by the account owners. The action with selected 505a option comprises initiating an exchange by clicking on the exchange button 505b or the breakoff exchange button 505c.

Figure 5B:
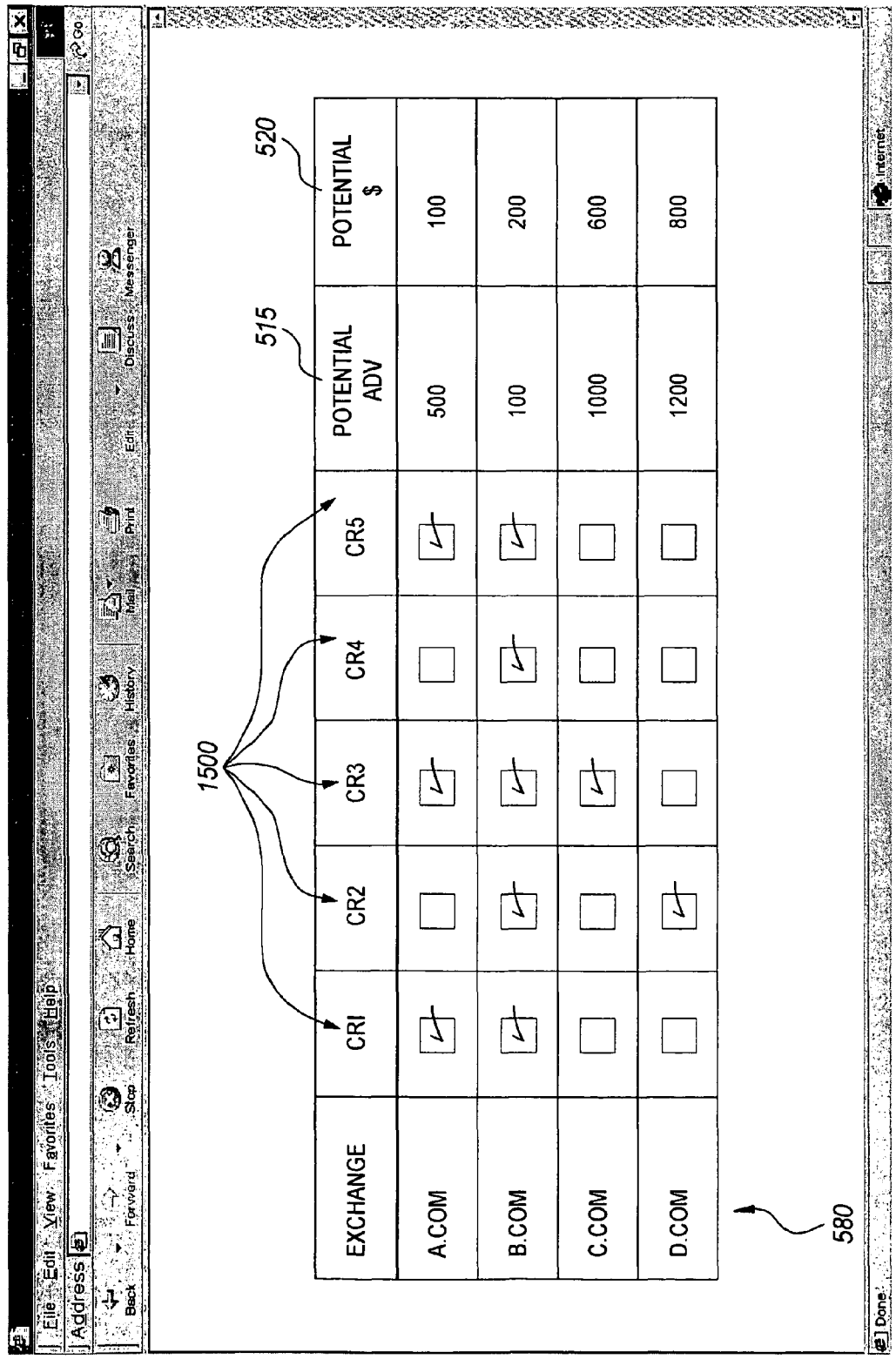
FIG. 5B is a screen shot illustrating an exemplary exchange table having a plurality of exchange criteria in a link exchange system according to the present invention.

As shown in FIG. 5B, the link exchange system 100 can automatically (and in real time or with a delay, based on system resources) display in column 515 how many potential publishers/advertisers are available, depending on the criteria (CR1 through CR5) selected. The system 100 also displays in column 520 how much potential dollar amount can be earned or spent, given the specified criteria in criteria columns 1500 (CR1 through CR5) selected as applied to the websites displayed in the exchange column 580. The link exchange system 100 will crawl the Internet and find potential sites for exchange, based on each client's multiple criteria, i.e., criteria CR1 through CR5, which could be words, page content, a combination of words and page content, or the like, and will exchange links with those sites on behalf of a webmaster based on those multiple criteria. The system 100 will also monitor these links automatically. Moreover, links can be rotated on the link page(s) to provide the opportunity for more visibility of at least some links on a particular web page. Webmasters/account owners of system 100 are given code to be included on their servers and/or in their pages to display and/or host links and other media, as well as displaying other related information. The link rotation option is provided by the system 100 and is selectable by a webmaster for web pages under his/her control. The web page rotation can be randomized or have a fall-out rate based on some criteria or formula.

In settings, the system 100 allows webmasters to have multiple anchor text, i.e., text/words they use in links to link back to their site from sites of their link partners, or for other media such as clips, images, movies, or the like.

For example abcdeflaw.com might link back to their site with the words "patent law" or "patent attorney" etc., as follows:

<a href="http://www.abcdeflaw.com/">Patent Law</a>
<a href="http://www.abcdeflaw.com/">Patent attorney</a>.

Users of the system 100 can receive requests for link exchange from webmasters via email messages. The content of a link exchange request email message may have the site's URL and description, or just the URL. Upon email receipt, the system 100 automatically scans URLs against the links that are already present in the database of the webmaster that sent the email. This feature allows the webmaster to select links from the body if the link is not yet in the database and links were not exchanged with this site, and also select the category in which to include the site. The system 100 will also let the webmaster know if a reciprocal URL from a target site to the webmaster's site is present.

The system 100 also provides link exchanges between a webmaster's sites at random, by content, by keyword present in the body and/or description and/or meta tags, and the like, or manually. Each webmaster has an account on the system 100 where he/she can enter domains (sites). Within the system 100 each site has its own location for setting criteria.

Additionally, there is a function within the system 100, wherein the webmaster can copy a site structure from one site to the next to avoid reentering settings. In this way the webmaster can change only those things that differ from site to site, if such differences exist.

Moreover, in addition to exchanging page links, the link exchange system 100 can exchange banners (picture files), audio files, music files, multimedia files, and the like, with or without page links. For example, the system 100 allows entry of an image location, alternatively allowing an upload of the image, depending on a desired hosting location. (the image can reside on the link exchange system server 105 or somewhere else). For each exchange data type, the link exchange system 100 allows entry of the description in a description field. The link exchange system 100 then generates the code automatically to display on a partner's site.

Moreover, the system 100 monitors the availability of the image in its place. The image must be hosted on a webmaster's site or on the Link exchange system to ensure integrity of the link. If the image is hosted on the partner's site, then the need for image recognition software comes into play. It is contemplated that the link exchange system includes such image recognition software to further ensure link integrity in such instances.

Movies would be exchanged in the same fashion. The location of the movie would be embedded in the code. The webmaster can host the movie on server 105 of the link exchange system 100 or on his own server. Music would be displayed similarly. In the examples above, links could be made out of the media itself or placed somewhere near by like, as in the example that follows. Music and Videos would be linked in the similar fashion. Music and video references can be embedded in the code. The multimedia data exchanged can have media player controls, e.g., play, stop, pause, or the like, on the same page or in a new window. "Iframes" are known in the art and may be used to accomplish multimedia exchange among websites. Utilizing the link exchange system 100 for multimedia exchange, webmasters are assured of mutually reciprocal links, the idea being "you share yours, I share mine, if you stop sharing yours, I want to know and stop sharing mine, automatically", i.e., the link exchange system 100 will automatically break a link of a non-compliant partner.

Another example of advantageous use of the link exchange system 100 is when two networks decide to share live feed of a certain event or different events, but are in "arms length" relationship, i.e., they don't trust each other enough or they have no way of checking (maybe there are thousands of feeds to check). If the other side is sharing all that it contracted/agreed to do, the link exchange system 100 would permit the links/media exchange. As part of the criteria (whitelist/blacklist), the system 100 may also monitor sound and video quality, and if the quality meets a minimum standard, the mutual links are whitelisted, but if the quality drops below the minimum standard, the mutual links are blacklisted. It is within the contemplation of the present invention that mobile devices over wireless networks, or over the Internet or other channels, can utilize the link exchange system 100 to allow or deny (based on the aforementioned criteria) exchange of a variety of types of media and channels of communications.

Timeout delay will be implemented by users for each/all of the media types (Links, Videos, Music, Images, or the like. Users will have an option on the link exchange system 100 to set these type of parameters). In case of force majeur circumstances, network outage, or the server being down, they will have in their settings the ability to enable and control how much time they give each or all partners in such cases. This feature also applies to links or the like.

Fallout exchange is also contemplated by the link exchange system 100. Let's say five webmasters participate in this type of exchange. They have the choice in their settings to specify how many links (or a percentage of links) they are willing to use for "fall out" exchange out of the total normal two-way links. (between 1%-100%). The system 100 then would mix and match sites based on those settings and use sites in this type of exchange, meaning the system 100 will not display links from webmaster 1's site to webmaster 2's site, participating in this type of exchange automatically, based on the webmasters' multiple criteria for this particular task. If webmaster1 and webmaster2 are participating in "fallout exchange", there are a total of one hundred webmasters, and both webmaster1 and webmaster2 specify that they are willing to use 25% for this type of exchange, the system 100 will automatically calculate and use 25% of the total websites participating, thereby using 25 sites. At any given time, webmaster1 can have fewer links pointing at him (e.g., 75) than he points out to other webmasters (in this case 99) or have more links pointing at him (let's say, 99) than he points out to other webmasters (in this case, 75). The number of dropped links can vary, and will be determined by the system automatically, so that dropped links will be, for this example, between 1 and 25 links.

It is to be understood that the present invention is not limited to the embodiment described above, but encompasses any and all embodiments within the scope of the following claims.

The invention claimed is:

1. A computerized method for automatically reciprocally exchanging links between a first website's link page and a second website's link page via an intermediary website, comprising the steps of:
   storing first link information related to the first website, the first website being associated with an owner of a first account on the intermediary website;
   storing second link information related to the second website, the second website being associated with an owner of a second account on the intermediary website;
   accepting first filter criteria from at least one of the website account owners, the first filter criteria forming at least one whitelist, the at least one whitelist being associated with the website belonging to the at least one of the website account owners;
   accepting second filter criteria from at least one of the website account owners, the second filter criteria forming at least one blacklist, the at least one blacklist being associated with the website belonging to the at least one of the website account owners;
   comparing the first and second link information to the first filter criteria in the at least one whitelist, the comparing being done automatically by the intermediary website;
   comparing the first and second link information to the second filter criteria in the at least one blacklist, the comparing being done automatically by the intermediary website; and
   creating reciprocal links between the first and second account owner's websites only if the first website link information and the second website link information is absent from the criteria on the at least one blacklist and only if at least one item of the first website link information or the second website information appears on the at least one whitelist, the creating being done by the intermediary website through a network.

2. The computerized link exchange method according to claim 1, wherein said first account and said second account have a common owner.

3. The computerized link exchange method according to claim 1, wherein said first account and said second account are the same account.

4. The computerized link exchange method according to claim 1, further comprising the steps of:
   accepting third filter criteria from an administrator of the intermediary website, the third filter criteria forming at least one global whitelist applicable across all account owners' websites;

accepting fourth filter information from the administrator of the intermediary website, the fourth filter criteria forming at least one global blacklist applicable across all account owners' websites;

comparing said first and second link information to the third filter criteria in the at least one global whitelist;

comparing said first and second link information to the fourth filter criteria in the at least one global blacklist; and creating reciprocal links between first and second account owner's websites only if said first and said second website link information are absent from the at least one global blacklist and at least one item of said first and said second website link information appears on the at least one global whitelist.

5. The computerized link exchange method according to claim 1, further comprising the steps of:

providing an auto-exchange feature on the intermediary website accepting exchange conditions from a user, the exchange conditions including categories and minimal page rank (PR) of sites with which user's site will engage in a link exchange, the auto-exchange feature automatically picking up partners and carrying out a link exchange with the partners;

independently monitoring the presence of reciprocal links and their conformity to the exchange conditions, the monitoring being performed by the intermediary website;

creating non-reciprocal link exchanges in which a first site links to a second site, the second site linking to a third site, thereby raising a page ranking of the links as calculated by a search engine;

accepting link exchanges entered manually by the user; and cataloging, registering and sorting websites, the website sorting being based on website categories, website page ranks, and website keywords, the cataloging, registering and sorting assisting in the entry of manually entered link exchanges.

6. The computerized link exchange method according to claim 1, further comprising the steps of:

accepting user entry of a plurality of links at once, thereby obviating the necessity of single link form filling;

creating site pools based on administrator entry of site pool criteria;

comparing new requests to join an existing site pool against the site pool's criteria and only allowing the site pool to join if the requesting site matches the existing site pool's criteria;

selectively entering a criteria-matched site into a single site pool or all matching site pools based on a site administrator's preference;

adding or removing sites from the site pools based on multiple criteria recorded in said at least one whitelist and said at least one blacklist;

creating site pools upon user requests for new pools, industry specific pools, country/region specific pools, and keyword specific pools;

automatically displaying how many potential publishers/advertisers are available depending on user-selected site criteria;

discovering potential sites for exchange via an Internet crawl, the potential site discovering step being based on each of the user's multiple site criteria;

rotating links on a display page, thereby providing an opportunity for more visibility of at least some of the links on a specific web page;

copying a site structure from a fourth site to a fifth site;

exchanging banners, audio files, music files, and multimedia files; and periodically dropping a user-specified percentage of the user's links, thereby providing a fallout exchange feature.

7. A link exchange website, comprising:

a server computer;

a data storage medium connected to the computer;

means for connecting the server computer to a network; and server software operable on the server computer, the server software including:

means for publishing a website on the network;

means for registering a plurality of account owners, the account owners being owners of websites connected to the network;

means for receiving and storing link information for establishing a link on a link page on each of the registered account owners' websites;

means for receiving and storing whitelist filter criteria from each of the registered account owners, the whitelist filter criteria designating acceptable conditions for creating a reciprocal link exchange with another website;

means for receiving and storing blacklist filter criteria from each of the registered account owners, the blacklist filter criteria designating conditions for refusing a reciprocal link exchange with another website;

means for comparing the whitelist and blacklist filter criteria, if any, of any two of the registered account owners to the link information provided by the two registered account owners; and means for creating reciprocal links to each other websites when the two registered account owners' link information is absent from the blacklist filter criteria and at least one item of the two account owners' link information appears on the whitelist filter criteria.

8. The link exchange website according to claim 7, wherein said server software further comprises means for establishing reciprocal links between multiple web sites owned by a single one of the registered account owners.

9. The link exchange website according to claim 7, wherein said server software further comprises:

means for creating at least one global whitelist containing third filter criteria imposed by an administrator of the server website for accepting a reciprocal link exchange, the at least one global whitelist being globally applicable across all of the account owners' websites;

means for creating at least one global blacklist containing fourth filter criteria imposed by the administrator of the server website for refusing a reciprocal link exchange, the at least one global blacklist being globally applicable across all account owners' websites;

means for comparing the link information to the at least one global whitelist and the at least one global blacklist; and means for creating reciprocal links between two of the account owner's websites when the link information is absent from the at least one global blacklist and at least one item of link information is present on the at least one global whitelist.

10. The link exchange website according to claim 7, wherein said server software further comprises:

means for accepting auto-exchange conditions from a user, the auto-exchange conditions including categories and minimal page rank (PR) of sites with which the user's site will engage in a link exchange, the auto-exchange automatically picking up partners and carrying out a link exchange with the partners;

means for monitoring the presence of reciprocal links and their conformity to the auto-exchange conditions;

means for creating non-reciprocal link exchanges in which a first site links to a second site, the second site linking to a third site, thereby raising a page ranking of the links as calculated by a search engine;

means for accepting link exchanges entered manually by the user; and means for cataloging, registering and sorting websites, the website sorting being based on website categories, website page ranks, and website keywords, the cataloging, registering and sorting assisting in the entry of manually entered link exchanges.

11. The link exchange website according to claim 7, wherein said server software further comprises:

means for accepting user entry of a plurality of links at once, thereby obviating the necessity of single link form filling;

means for creating site pools based on administrator entry of site pool criteria;

means for comparing new requests to join an existing site pool against the site pool's criteria and only allowing the site pool to join if the requesting site matches the existing site pool's criteria;

means for selectively entering a criteria matched site into a single site pool or all matching site pools based on a site administrator's preference;

means for adding or removing sites from the site pools based on multiple criteria recorded in the whitelists and the blacklists;

means for creating site pools based on user requests for new pools, industry specific pools, country/region specific pools, and keyword specific pools;

means for automatically displaying how many potential publishers/advertisers are available depending on user selected site criteria;

means for discovering potential sites for exchange via an Internet crawl, based on each user's multiple site criteria;

means for rotating links on a display page thereby providing opportunity for more visibility of at least some links on a specific web page;

means for copying a site structure from a fourth site to a fifth site;

means for exchanging banners, audio files, music files, and multimedia files based on user selected criteria; and means for periodically dropping a user-specified percentage of the user's links, thereby providing a fallout exchange feature.

12. A computer product for automatically reciprocally exchanging links between a first website's link page and a second website's link page via an intermediary website, the product comprising a medium readable by a computer, the medium having a set of computer-readable instructions stored thereon executable by a processor when loaded into main memory, the instructions including:

a first set of instructions that, when loaded into main memory and executed by the processor, cause the processor to store first link information related to the first website, the first website being associated with an owner of a first account on the intermediary website;

a second set of instructions that, when loaded into main memory and executed by the processor, cause the processor to store second link information related to the second website, the second website being associated with an owner of a second account on the intermediary website;

a third set of instructions that, when loaded into main memory and executed by the processor, cause the processor to accept first filter criteria from at least one of the website account owners, the first filter criteria forming at least one whitelist, the at least one whitelist being associated with the website belonging to the at least one of the website account owners;

a fourth set of instructions that, when loaded into main memory and executed by the processor, cause the processor to accept fourth filter information from the administrator of the intermediary website, the fourth filter criteria forming at least one global blacklist applicable across all account owners' websites;

a fifth set of instructions that, when loaded into main memory and executed by the processor, cause the processor to compare the first and second link information to the first filter criteria in the at least one whitelist, the comparing being done automatically by the intermediary website;

a sixth set of instructions that, when loaded into main memory and executed by the processor, cause the processor to compare the first and second link information to the second filter criteria in the at least one blacklist, the comparing being done automatically by the intermediary website; and a seventh set of instructions that, when loaded into main memory and executed by the processor, cause the processor to create reciprocal links between the first and second account owner's websites only if the first website link information and the second website link information is absent from the criteria on the at least one blacklist and only if at least one item of the first website link information or the second website information appears on the at least one whitelist, the creating being done by the intermediary website through a network.

13. The computer product according to claim 12, wherein said first account and said second account have a common owner.

14. The computer product according to claim 12, wherein said first account and said second account are the same account.

15. The computer product according to claim 12, wherein said instructions further comprise:

an eighth set of instructions which, when loaded into main memory and executed by a processor, causes the processor to accept third filter criteria from an administrator of the intermediary website, the third filter criteria forming at least one global whitelist applicable across all account owners' websites;

a ninth set of instructions which, when loaded into main memory and executed by a processor, causes the processor to accept fourth filter information from the administrator of the intermediary website, the fourth filter criteria forming at least one global blacklist applicable across all account owners' websites;

a tenth set of instructions which, when loaded into main memory and executed by a processor, causes the processor to compare said first and second link information to the third filter criteria in the at least one global whitelist;

an eleventh set of instructions which, when loaded into main memory and executed by a processor, causes the processor to compare said first and second link information to the fourth filter criteria in the at least one global blacklist; and a twelfth set of instructions which, when loaded into main memory and executed by a processor, causes the processor to create reciprocal links between first and second account owner's websites only if said first and said second website link information are absent from the at least one global blacklist and at least one item of said first and said second website link information appears on the at least one global whitelist.

16. The computer product according to claim 12, wherein said instructions further comprise:

a thirteenth set of instructions which, when loaded into main memory and executed by a processor, causes the processor to provide providing an auto-exchange feature on the intermediary website accepting exchange conditions from a user, the exchange conditions including categories and minimal page rank (PR) of sites with which user's site will engage in a link exchange, the auto-exchange feature automatically picking up partners and carrying out a link exchange with the partners;

a fourteenth set of instructions which, when loaded into main memory and executed by a processor, causes the processor to independently monitor the presence of reciprocal links and their conformity to the exchange conditions, the monitoring being performed by the intermediary website;

a fifteenth set of instructions which, when loaded into main memory and executed by a processor, causes the processor to create non-reciprocal link exchanges in which a first site links to a second site, the second site linking to a third site, thereby raising a page ranking of the links as calculated by a search engine;

a sixteenth set of instructions which, when loaded into main memory and executed by a processor, causes the processor to accept link exchanges entered manually by the user; and a seventeenth set of instructions which, when loaded into main memory and executed by a processor, causes the processor to catalog, register and sort websites, the website sorting being based on website categories, website page ranks, and website keywords, the cataloging, registering and sorting assisting in the entry of manually entered link exchanges.

17. The computer product according to claim 12, wherein said instructions further comprise:

an eighteenth set of instructions which, when loaded into main memory and executed by a processor, causes the processor to accept user entry of a plurality of links at once, thereby obviating the necessity of single link form filling;

a nineteenth set of instructions which, when loaded into main memory and executed by a processor, causes the processor to create site pools based on administrator entry of site pool criteria;

a twentieth set of instructions which, when loaded into main memory and executed by a processor, causes the processor to compare new requests to join an existing site pool against the site pool's criteria and only allowing the site pool to join if the requesting site matches the existing site pool's criteria;

a twenty-first set of instructions which, when loaded into main memory and executed by a processor, causes the processor to selectively enter a criteria-matched site into a single site pool or all matching site pools based on a site administrator's preference;

a twenty-second set of instructions which, when loaded into main memory and executed by a processor, causes the processor to add or remove sites from the site pools based on multiple criteria recorded in said at least one whitelist and said at least one blacklist;

a twenty-third set of instructions which, when loaded into main memory and executed by a processor, causes the processor to create site pools upon user requests for new pools, industry specific pools, country/region specific pools, and keyword specific pools;

a twenty-fourth set of instructions which, when loaded into main memory and executed by a processor, causes the processor to automatically display how many potential publishers/advertisers are available depending on user-selected site criteria;

a twenty-fifth set of instructions which, when loaded into main memory and executed by a processor, causes the processor to discover potential sites for exchange via an Internet crawl, the potential site discovering being based on each of the user's multiple site criteria;

a twenty-sixth set of instructions which, when loaded into main memory and executed by a processor, causes the processor to rotate links on a display page, thereby providing an opportunity for more visibility of at least some of the links on a specific web page;

a twenty-seventh set of instructions which, when loaded into main memory and executed by a processor, causes the processor to copy a site structure from a fourth site to a fifth site;

a twenty-eighth set of instructions which, when loaded into main memory and executed by a processor, causes the processor to exchange banners, audio files, music files, and multimedia files; and a twenty-ninth set of instructions which, when loaded into main memory and executed by a processor, causes the processor to periodically drop a user-specified percentage of the user's links, thereby providing a fallout exchange feature.

* * * * *